(12) United States Patent
Moseman et al.

(10) Patent No.: US 10,801,813 B2
(45) Date of Patent: Oct. 13, 2020

(54) ADJUSTABLE-POWER DATA RAIL ON A DIGITAL WEAPON SIGHT

(71) Applicant: N2 Imaging Systems, LLC, Irvine, CA (US)

(72) Inventors: Samuel Moseman, Orange, CA (US); Henry William Neal, Aliso Viejo, CA (US)

(73) Assignee: N2 Imaging Systems, LLC, Irvine, CA (US)

( * ) Notice: Subject to any disclaimer, the term of this patent is extended or adjusted under 35 U.S.C. 154(b) by 27 days.

(21) Appl. No.: 16/183,479

(22) Filed: Nov. 7, 2018

(65) Prior Publication Data

US 2020/0141700 A1    May 7, 2020

(51) Int. Cl.
*F41G 1/35* (2006.01)
*F41G 11/00* (2006.01)
(Continued)

(52) U.S. Cl.
CPC .............. *F41G 11/003* (2013.01); *F41G 1/35* (2013.01); *F41G 1/36* (2013.01); *F41G 3/065* (2013.01)

(58) Field of Classification Search
CPC . F41G 11/003; F41G 1/35; F41G 1/36; F41G 3/065
(Continued)

(56) References Cited

U.S. PATENT DOCUMENTS 2,452,592 A    11/1948    Meyer
2,627,659 A    2/1953    Murr
(Continued)

FOREIGN PATENT DOCUMENTS

CN    202057884    11/2011
CN    204730844    10/2015
(Continued)

OTHER PUBLICATIONS

Aebi, V. et al., "EBAPS: Next Generation, Low Power, Digital Night Vision", Presented at the OPTRO 2005 International Symposium, May 10, 2005, pp. 1-10, Paris, France, in 10 pages.
(Continued)

*Primary Examiner* — Joshua E Freeman
(74) *Attorney, Agent, or Firm* — Knobbe, Martens, Olson & Bear, LLP (57) ABSTRACT

A digital sight for a weapon, is provided that includes an adjustable power supply (APS) configured to supply power, a sight body, a sight interface, and a controller. The sight interface is fixed to the sight body, includes a sight power conductor connected to the APS for receiving power supplied by the APS, and is configured for mechanically coupling with a cooperating peripheral interface of a peripheral for fixing the peripheral to the digital sight and to be coupled with a peripheral power conductor of the peripheral interface for providing power from the adjustable power supply to the peripheral. The controller is programmed to receive a data communication having an optimal power indication from the peripheral and based on the optimal power indication, control the APS to adjust the power supplied by the APS to the sight power conductor. The disclosure further encompasses a weapon assembly, a peripheral, and a method.

8 Claims, 5 Drawing Sheets

(51) Int. Cl.
*F41G 1/36* (2006.01)
*F41G 3/06* (2006.01)

(58) Field of Classification Search
USPC .......................................................... 42/111
See application file for complete search history.

(56) References Cited

U.S. PATENT DOCUMENTS

| | | |
|---|---|---|
| 2,901,750 A | 9/1959 | McMurry |
| 2,901,751 A | 9/1959 | Gales et al. |
| 2,908,943 A | 10/1959 | Miller |
| 3,320,619 A | 5/1967 | Lastnik et al. |
| 3,413,656 A | 12/1968 | Vogliano et al. |
| 3,419,334 A | 12/1968 | Hubbard |
| 3,594,062 A | 7/1971 | Disley |
| 3,640,635 A | 2/1972 | Von Hollen |
| 3,669,523 A | 6/1972 | Edwards |
| 4,044,399 A | 8/1977 | Morton |
| 4,183,646 A | 1/1980 | Tsunefuji |
| 4,584,776 A | 4/1986 | Shepherd |
| 4,601,540 A | 7/1986 | Karning et al. |
| 4,605,281 A | 8/1986 | Hellewell |
| 4,698,489 A | 10/1987 | Morley |
| 4,758,719 A | 7/1988 | Sasaki et al. |
| 4,786,966 A | 11/1988 | Hanson et al. |
| 4,792,206 A | 12/1988 | Skuratovsky |
| 4,840,451 A | 6/1989 | Sampson et al. |
| 5,005,213 A | 4/1991 | Hanson et al. |
| 5,035,472 A | 7/1991 | Hansen |
| 5,125,394 A | 6/1992 | Chatenever et al. |
| 5,128,807 A | 7/1992 | Blackmon |
| 5,140,151 A | 8/1992 | Weiner et al. |
| 5,303,606 A | 4/1994 | Kokinda |
| 5,303,688 A | 4/1994 | Chiuminatta et al. |
| 5,359,675 A | 10/1994 | Siwoff |
| 5,448,161 A | 9/1995 | Byerley, III et al. |
| 5,463,495 A | 10/1995 | Murg |
| 5,513,440 A | 5/1996 | Murg |
| 5,535,053 A | 7/1996 | Baril et al. |
| 5,584,137 A | 12/1996 | Teetzel |
| 5,651,081 A | 7/1997 | Blew et al. |
| 5,653,034 A | 8/1997 | Bindon |
| 5,668,904 A | 9/1997 | Sutherland et al. |
| 5,687,271 A | 11/1997 | Rabinowitz |
| 5,711,104 A | 1/1998 | Schmitz |
| 5,847,753 A | 12/1998 | Gabello et al. |
| 5,881,449 A | 3/1999 | Ghosh et al. |
| 5,903,996 A | 5/1999 | Morley |
| 5,946,132 A | 8/1999 | Phillips |
| 5,949,565 A | 9/1999 | Ishida |
| 5,953,761 A | 9/1999 | Jurga et al. |
| 5,956,444 A | 9/1999 | Duda et al. |
| 6,020,994 A | 2/2000 | Cook |
| 6,057,966 A | 5/2000 | Carroll et al. |
| 6,200,041 B1 | 3/2001 | Gaio et al. |
| 6,272,692 B1 | 8/2001 | Abraham |
| 6,311,576 B1 | 11/2001 | Pletschet |
| 6,327,381 B1 | 12/2001 | Rogina et al. |
| 6,369,941 B2 | 4/2002 | Zadravec |
| 6,381,081 B1 | 4/2002 | Ford |
| 6,404,961 B1 | 6/2002 | Bonja et al. |
| 6,456,497 B1 | 9/2002 | Palmer |
| 6,519,890 B1 | 2/2003 | Otterman |
| 6,560,029 B1 | 5/2003 | Dobbie et al. |
| 6,574,053 B1 | 6/2003 | Spinali |
| 6,615,531 B1 | 9/2003 | Holmberg |
| 6,690,866 B2 | 2/2004 | Bonja et al. |
| 6,714,708 B2 | 3/2004 | McAlpine et al. |
| 6,807,742 B2 | 10/2004 | Schick et al. |
| 6,898,192 B2 | 5/2005 | Chheda et al. |
| 6,901,221 B1 | 5/2005 | Jiang et al. |
| 7,016,579 B2 | 3/2006 | Militaru et al. |
| 7,062,796 B1 | 6/2006 | Dixon |
| D524,785 S | 7/2006 | Huang |
| 7,069,685 B2 | 7/2006 | Houde-Walter |
| 7,096,512 B2 | 8/2006 | Blair |
| 7,128,475 B2 | 10/2006 | Kesler |
| 7,132,648 B2 | 11/2006 | Ratiff et al. |
| 7,166,812 B2 | 1/2007 | White et al. |
| 7,171,776 B2 | 2/2007 | Staley, III |
| 7,194,012 B2 | 3/2007 | Mason et al. |
| 7,210,262 B2 | 5/2007 | Florence et al. |
| 7,210,392 B2 | 5/2007 | Greene et al. |
| 7,219,370 B1 | 5/2007 | Teetzel et al. |
| 7,278,734 B2 | 10/2007 | Jannard et al. |
| 7,292,262 B2 | 11/2007 | Towery et al. |
| 7,298,941 B2 | 11/2007 | Palen et al. |
| 7,319,557 B2 | 1/2008 | Tai |
| 7,369,302 B2 | 5/2008 | Gaber |
| 7,409,792 B2 | 8/2008 | Narcy et al. |
| 7,437,848 B2 | 10/2008 | Chang |
| 7,462,035 B2 | 12/2008 | Lee et al. |
| 7,488,294 B2 | 2/2009 | Torch |
| 7,552,559 B2 | 6/2009 | Day |
| 7,609,467 B2 | 10/2009 | Blanding et al. |
| 7,612,956 B2 | 11/2009 | Blanding et al. |
| 7,627,975 B1 | 12/2009 | Hines |
| 7,649,550 B2 | 1/2010 | Ishiyama et al. |
| 7,676,137 B2 | 3/2010 | Schick et al. |
| 7,690,849 B2 | 4/2010 | Scharf et al. |
| 7,701,493 B2 | 4/2010 | Mauritzson |
| 7,705,855 B2 | 4/2010 | Brown Elliott |
| 7,710,654 B2 | 5/2010 | Ashkenazi et al. |
| 7,730,820 B2 | 6/2010 | Vice et al. |
| 7,740,499 B1 | 6/2010 | Willey et al. |
| 7,744,286 B2 | 6/2010 | Lu et al. |
| 7,787,012 B2 | 8/2010 | Scales et al. |
| 7,795,574 B2 | 9/2010 | Kennedy et al. |
| 7,800,852 B2 | 9/2010 | Blanding et al. |
| 7,827,723 B1 | 11/2010 | Zaderey et al. |
| 7,832,023 B2 | 11/2010 | Crisco |
| 7,842,922 B2 | 11/2010 | Leneke et al. |
| 7,899,332 B2 | 3/2011 | Shindou et al. |
| 7,911,687 B2 | 3/2011 | Scholz |
| 7,916,156 B2 | 3/2011 | Brown Elliott et al. |
| 7,933,464 B2 | 4/2011 | Zhang et al. |
| 7,952,059 B2 | 5/2011 | Vitale et al. |
| 7,972,067 B2 | 7/2011 | Haley et al. |
| 7,990,523 B2 | 8/2011 | Schlierbach et al. |
| 8,014,679 B2 | 9/2011 | Yamazaki |
| 8,063,934 B2 | 11/2011 | Donato |
| 8,067,735 B2 | 11/2011 | King et al. |
| 8,082,688 B2 | 12/2011 | Elpedes et al. |
| 8,085,482 B2 | 12/2011 | Frankovich et al. |
| 8,093,992 B2 | 1/2012 | Jancic et al. |
| 8,112,185 B2 | 2/2012 | Wu |
| 8,153,975 B2 | 4/2012 | Hollander et al. |
| 8,225,542 B2 | 7/2012 | Houde-Walter |
| 8,253,105 B1 | 8/2012 | Warnke et al. |
| 8,312,667 B2 | 11/2012 | Thomas et al. |
| 8,336,776 B2 | 12/2012 | Horvath et al. |
| 8,337,036 B2 | 12/2012 | Soto et al. |
| 8,350,796 B2 | 1/2013 | Tomizawa et al. |
| 8,375,620 B2 | 2/2013 | Staley, III |
| D677,298 S | 3/2013 | Hallgren |
| 8,411,346 B2 | 4/2013 | Sapir |
| 8,488,969 B1 | 7/2013 | Masarik |
| 8,531,592 B2 | 9/2013 | Teetzel et al. |
| 8,532,490 B2 | 9/2013 | Smith et al. |
| 8,656,628 B2 | 2/2014 | Jock et al. |
| 8,717,392 B2 | 5/2014 | Levola |
| 8,773,766 B2 | 7/2014 | Jannard et al. |
| 8,776,422 B2 | 7/2014 | Dodd et al. |
| 8,781,273 B2 | 7/2014 | Benjamin et al. |
| 8,826,583 B2 | 9/2014 | Kepler et al. |
| 8,849,379 B2 | 9/2014 | Abreu |
| 8,886,046 B2 | 11/2014 | Masarik |
| 8,908,045 B2 | 12/2014 | Stewart |
| 8,923,703 B2 | 12/2014 | Masarik |
| 8,928,878 B2 | 1/2015 | Jaeschke et al. |
| 8,942,632 B2 | 1/2015 | Shen |
| 8,963,573 B2 | 2/2015 | Achkir et al. |
| 9,042,736 B2 | 5/2015 | Masarik |
| 9,052,153 B2 | 6/2015 | Oh et al. |

(56) References Cited

U.S. PATENT DOCUMENTS

| | | | |
|---|---|---|---|
| 9,057,583 B2 | 6/2015 | Matthews et al. |
| 9,069,001 B2 | 6/2015 | Braman et al. |
| 9,113,061 B1 | 8/2015 | Morley |
| 9,225,419 B2 | 12/2015 | Masarik |
| 9,310,163 B2 | 4/2016 | Bay |
| 9,316,462 B2 | 4/2016 | Varshneya |
| 9,319,143 B2 | 4/2016 | El-Ahmadi et al. |
| 9,335,122 B2 | 5/2016 | Choiniere |
| 9,366,504 B2 | 6/2016 | Hester et al. |
| 9,373,277 B2 | 6/2016 | Sagan |
| 9,389,677 B2 | 7/2016 | Hobby et al. |
| 9,429,391 B2 | 8/2016 | Walker |
| 9,438,774 B2 | 9/2016 | Masarik |
| 9,466,120 B2 | 10/2016 | Maryfield et al. |
| 9,506,725 B2 | 11/2016 | Maryfield et al. |
| 9,516,202 B2 | 12/2016 | Masarik et al. |
| 9,593,913 B1 | 3/2017 | Wright et al. |
| 9,615,004 B2 | 4/2017 | Masarik |
| 9,622,529 B2 | 4/2017 | Teetzel et al. |
| 9,658,423 B2 | 5/2017 | Gustafson et al. |
| 9,696,111 B2 | 7/2017 | Saadon |
| 9,705,605 B2 | 7/2017 | Masarik |
| 9,769,902 B1 | 9/2017 | Cain et al. |
| 9,823,043 B2 | 11/2017 | Compton et al. |
| 9,861,263 B2 | 1/2018 | Kwan et al. |
| 9,897,411 B2 | 2/2018 | Compton et al. |
| 9,910,259 B2 | 3/2018 | Armbruster et al. |
| 9,921,028 B2 | 3/2018 | Compton et al. |
| 9,934,739 B2 | 4/2018 | Hogan |
| 9,948,878 B2 | 4/2018 | Simolon et al. |
| 9,995,901 B2 | 6/2018 | Petersen |
| 10,003,756 B2 | 6/2018 | Masarik et al. |
| 10,024,631 B2 | 7/2018 | Portoghese et al. |
| 10,036,869 B2 | 7/2018 | Fahr et al. |
| 10,095,089 B2 | 10/2018 | Po et al. |
| 10,113,837 B2 | 10/2018 | Masarik et al. |
| 10,151,564 B2 * | 12/2018 | Galli | F41G 11/003 |
| 10,190,848 B2 | 1/2019 | VanBecelaere |
| 10,309,749 B2 | 6/2019 | Hamilton |
| 10,379,135 B2 | 8/2019 | Maryfield et al. |
| 2002/0027690 A1 | 3/2002 | Bartur et al. |
| 2004/0031184 A1 | 2/2004 | Hope |
| 2005/0058444 A1 | 3/2005 | Watanabe et al. |
| 2005/0114710 A1 | 5/2005 | Cornell et al. |
| 2005/0225575 A1 | 10/2005 | Brown Elliott et al. |
| 2005/0232512 A1 | 10/2005 | Luk et al. |
| 2005/0254126 A1 | 11/2005 | Lin et al. |
| 2005/0268519 A1 | 12/2005 | Pikielny |
| 2006/0165413 A1 | 7/2006 | Schemmann et al. |
| 2007/0003562 A1 | 1/2007 | Druilhe |
| 2007/0035626 A1 | 2/2007 | Randall et al. |
| 2007/0213586 A1 | 9/2007 | Hirose et al. |
| 2007/0257944 A1 | 11/2007 | Miller et al. |
| 2008/0263752 A1 | 10/2008 | Solinsky et al. |
| 2008/0309586 A1 | 12/2008 | Vitale |
| 2008/0317474 A1 | 12/2008 | Wang et al. |
| 2009/0052023 A1 | 2/2009 | Winker et al. |
| 2009/0181729 A1 | 7/2009 | Griffin, Jr. et al. |
| 2010/0027943 A1 | 2/2010 | Armani et al. |
| 2010/0149073 A1 | 6/2010 | Chaum et al. |
| 2010/0225673 A1 | 9/2010 | Miller et al. |
| 2010/0266245 A1 | 10/2010 | Sabo |
| 2010/0308999 A1 | 12/2010 | Chornenky |
| 2010/0328420 A1 | 12/2010 | Roman |
| 2011/0030264 A1 | 2/2011 | Davidson et al. |
| 2011/0041377 A1 | 2/2011 | Thomas et al. |
| 2011/0067288 A1 | 3/2011 | Hakansson et al. |
| 2011/0145981 A1 | 6/2011 | Teetzel |
| 2011/0187563 A1 | 8/2011 | Sanders-Reed |
| 2011/0213664 A1 | 9/2011 | Osterhout et al. |
| 2011/0214082 A1 | 9/2011 | Osterhout et al. |
| 2011/0239354 A1 | 10/2011 | Celona et al. |
| 2012/0030985 A1 | 2/2012 | Mauricio et al. |
| 2012/0033195 A1 | 2/2012 | Tai |
| 2012/0097741 A1 | 4/2012 | Karcher |
| 2012/0159833 A1 | 6/2012 | Hakanson et al. |
| 2012/0182417 A1 | 7/2012 | Everett |
| 2012/0182610 A1 | 7/2012 | O'Hara et al. |
| 2012/0192476 A1 | 8/2012 | Compton et al. |
| 2012/0212414 A1 | 8/2012 | Osterhout et al. |
| 2012/0238208 A1 | 9/2012 | Bienas et al. |
| 2012/0255213 A1 * | 10/2012 | Panos | F41G 1/35 |
| | | | 42/115 |
| 2012/0311910 A1 | 12/2012 | Mironichev et al. |
| 2012/0317706 A1 | 12/2012 | Lebel et al. |
| 2012/0320340 A1 | 12/2012 | Coleman, III |
| 2012/0327247 A1 | 12/2012 | Mironichev et al. |
| 2013/0016215 A1 | 1/2013 | Bitar et al. |
| 2013/0033746 A1 | 2/2013 | Brumfield |
| 2013/0036646 A1 | 2/2013 | Rubac et al. |
| 2013/0061509 A1 * | 3/2013 | Allen | H01H 9/54 |
| | | | 42/115 |
| 2013/0072120 A1 | 3/2013 | Wu |
| 2013/0088604 A1 | 4/2013 | Hamrelius et al. |
| 2013/0167425 A1 | 7/2013 | Crispin |
| 2013/0188943 A1 | 7/2013 | Wu |
| 2013/0215395 A1 | 8/2013 | Li |
| 2014/0007485 A1 | 1/2014 | Castejon, Sr. |
| 2014/0104449 A1 | 4/2014 | Masarik et al. |
| 2014/0260748 A1 | 9/2014 | Traver |
| 2014/0285882 A1 | 9/2014 | Gotz et al. |
| 2015/0016817 A1 | 1/2015 | Hara et al. |
| 2015/0101234 A1 | 4/2015 | Priest et al. |
| 2015/0226613 A1 | 8/2015 | Bauer et al. |
| 2015/0282549 A1 | 10/2015 | Lebel et al. |
| 2015/0316351 A1 | 11/2015 | Choiniere |
| 2015/0375865 A1 | 12/2015 | Fischer et al. |
| 2016/0033234 A1 | 2/2016 | Swift et al. |
| 2016/0069640 A1 * | 3/2016 | Pretorius | F41G 3/065 |
| | | | 42/122 |
| 2016/0161735 A1 | 6/2016 | Armbruster et al. |
| 2016/0265880 A1 * | 9/2016 | Maryfield | F41G 3/08 |
| 2016/0327365 A1 | 11/2016 | Collin et al. |
| 2017/0010073 A1 | 1/2017 | Downing |
| 2017/0078022 A1 | 3/2017 | Masarik et al. |
| 2017/0153713 A1 | 6/2017 | Niinuma et al. |
| 2017/0237919 A1 | 8/2017 | Lamesch |
| 2017/0302386 A1 | 10/2017 | Masarik |
| 2018/0106568 A1 | 4/2018 | Hedeen et al. |
| 2018/0232952 A1 | 8/2018 | Hiranandani et al. |
| 2018/0246135 A1 | 8/2018 | Pan et al. |
| 2018/0302576 A1 | 10/2018 | Masarik et al. |
| 2018/0328698 A1 * | 11/2018 | Miller | F41C 27/00 |
| 2019/0033039 A1 | 1/2019 | Masarik et al. |
| 2019/0056198 A1 * | 2/2019 | Pautler | F41G 1/473 |
| 2019/0094981 A1 | 3/2019 | Bradski et al. |
| 2019/0166174 A1 | 5/2019 | Moseman |
| 2019/0222771 A1 | 7/2019 | Hedeen et al. |
| 2019/0346235 A1 * | 11/2019 | Sidelkovsky | F41G 1/473 |
| 2019/0353461 A1 | 11/2019 | Neal et al. |
| 2019/0353462 A1 | 11/2019 | Neal |
| 2019/0376764 A1 * | 12/2019 | Hammond | F41G 1/345 |
| 2019/0377171 A1 * | 12/2019 | Hammond | F41G 1/38 |
| 2020/0014887 A1 | 1/2020 | Moseman et al. |
| 2020/0018566 A1 * | 1/2020 | Tubb | F41A 21/44 |
| 2020/0051481 A1 | 2/2020 | Masarik et al. |
| 2020/0053303 A1 | 2/2020 | Vaklev et al. |

FOREIGN PATENT DOCUMENTS

| | | |
|---|---|---|
| CN | 204944509 | 1/2016 |
| CN | 106612141 | 5/2017 |
| EP | 0 176 169 | 4/1986 |
| EP | 2 722 632 | 4/2014 |
| EP | 2 812 749 | 12/2014 |
| EP | 3 172 524 | 5/2017 |
| EP | 3 205 974 | 8/2017 |
| EP | 3 239 754 | 11/2017 |
| GB | 2162654 | 2/1986 |
| JP | H07-295682 | 11/1995 |
| WO | WO 2005/121688 | 12/2005 |
| WO | WO 2016/014655 | 1/2010 |
| WO | WO 2013/080058 | 6/2013 |
| WO | WO 2013/102869 | 7/2013 |

(56) References Cited

FOREIGN PATENT DOCUMENTS

| WO | WO 2013/119983 | 8/2013 |
| WO | WO 2014/062725 | 4/2014 |
| WO | WO 2014/150076 | 9/2014 |
| WO | WO 2019/222422 | 11/2019 |
| WO | WO 2019/222426 | 11/2019 |

OTHER PUBLICATIONS

Ackerman, S., "It Only Took the Army 16 Years and 2 Wars to Deploy this Network", Wired.com, Jun. 28, 2012, in 7 pages. URL: http://www.wired.com/dangerrom/2012/06/army-data-network-war/all/.

Armstrong, S. C., "Project Manager Soldier Weapons Program Overview NDIA", May 15, 2012, in 38 pages.

Schott—Glass Made of Ideas, GBPS-MC-GOF-Demo, dated Jan. 2006, pp. S.1-S.8, in 8 pages.

Sklarek, W., "High Data Rate Capabilities of Multicore Glass Optical Fiber Cables, 22 FGT 'Otische Polymerfasern'", dated Oct. 25, 2006, in 19 pages. URL: http://www.pofac.de/downloads/itgfg/fgt2.2/FGT2.2_Munchen_Sklarek_GOF-Buendel.

Tao, R. et al., "10 Gb/s CMOS Limiting Amplifier for Optical links", Proceedings of the 29th European Solid-State Circuits Conference, Sep. 16-18, 2013, pp. 285-287, Estoril, Portugal, in 3 pages.

Zhu, Z. et al., "AR-Weapon: Live Augmented Reality Based First-Person Shooting System", 2015 IEEE Winter Conference on Applications of Computer Vision, Feb. 2015, in 8 pages.

PCT Application No. PCT/US2019/055711 International Search Report and Written Opinion dated Dec. 19, 2019, in 10 pages.

U.S. Appl. No. 13/674,895, filed Nov. 12, 2012, titled Intrapersonal Data Communication System, listing David Michael Masarik as an inventor, in 95 pages, and its entire prosecution history.

\* cited by examiner

ADJUSTABLE-POWER DATA RAIL ON A DIGITAL WEAPON SIGHT

BACKGROUND OF THE INVENTION

1. Field of the Invention

The present disclosure relates to digital weapon sights, and more particularly to an adjustable-power data rail on a modular digital weapon sight.

2. Description of Related Art

Weapons commonly include digital weapon sights for aiming. The weapon sight provides the shooter with a sight picture representative of where a projectile fired from the weapon will strike. Some weapons include modular weapon sights. Modular weapon sights allow for attachment of peripheral modules to the weapon sight. A peripheral module can be powered by the weapon sight to which it is attached, based on a fixed voltage that the weapon sight can provide. However, each peripheral module can have a unique efficiency profile, meaning one peripheral module may require to be, or operate best when, powered by a particular input voltage. This voltage may be different for different peripheral modules that can be attached to the weapon sight. It can therefore be necessary to limit the peripheral modules that can be attached to a weapon sight to peripheral modules that can operate using the fixed voltage that the weapon sight can provide.

Such conventional methods and systems have generally been considered satisfactory for their intended purpose. However, there is still a need in the art for improved digital weapon sights, weapon assemblies having digital weapon sights, and methods of powering peripheral modules attached to a digital weapon sight. The present disclosure provides a solution for this need.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a digital sight for a weapon. The digital sight includes an adjustable power supply (APS) configured to supply power, a sight body, a sight interface, and a controller. The sight interface is configured for mechanically coupling with a cooperating peripheral interface of a peripheral for fixing the peripheral to the digital sight. The sight interface is fixed to the sight body and includes a sight power conductor connected to the APS for receiving power supplied by the APS. The sight power conductor is further configured to be coupled with a peripheral power conductor of the peripheral interface for providing power from the adjustable power supply to the peripheral. The controller is disposed in communication with a non-volatile memory, wherein the controller, upon execution of the instructions is configured to receive a data communication having an optimal power indication from the peripheral and based on the optimal power indication, control the APS to adjust the power supplied by the APS to the sight power conductor.

In accordance with embodiments, the power provided by the APS to the sight power conductor can have a first power level before receiving the optimal power indication, and in response to the controller controlling the APS, the APS can adjust the power level of the power supplied to the sight power conductor to have a second power level different from the first power level.

In embodiments, the controller can be powered by power having a third power level supplied by the APS.

In embodiments, the optimal power indication can be received from the peripheral via a connector of the sight interface that can be configured for data communication with a peripheral connector of the peripheral interface.

In embodiments, the sight interface can mechanically couple with the cooperating peripheral interface for removably fixing the peripheral to the digital sight.

In embodiments, the digital sight can include a sensor for sensing at least one of images and pulses, and a processing system configured to process the sensed at least one of images and pulses.

In embodiments, the APS can include a potentiometer, and controlling the APS can include controlling the potentiometer.

In embodiments, the APS can include a resistor divider, and controlling the APS can include controlling selection of circuitry of the resistor divider.

In embodiments, the controller, upon execution of the instructions can be further configured to determine when a short circuit condition exists in the peripheral and control the APS to adjust the power supplied by the APS to the sight power conductor in response to a determination that a short circuit condition exists.

In another aspect, a method of adjusting power supplied to a peripheral that is configured to be mounted to a digital weapon sight is disclosed. The method includes mechanically fixing the peripheral to the digital weapon sight, adjustably supplying power, controlling the adjustment for supplying power to supply power having a first power level to the peripheral, receiving an optimal power indication from the peripheral, and based on the optimal power indication, controlling the adjustment for supplying power to supply power having a second power level to the peripheral.

In embodiments, the first power level can be different than the second power level.

In embodiments, the method can further include detecting that the peripheral has been mounted to the digital weapon sight. Controlling the adjustment for supplying power to supply power having the first power level to the peripheral can be performed in response to detecting that the peripheral has been mounted to the digital weapon sight.

In embodiments, mechanically fixing the peripheral to the digital weapon sight can include removably mechanically fixing the peripheral to the digital weapon sight.

In embodiments, the method can further include sensing at least one of images and pulses and processing the sensed at least one of images and pulses.

In embodiments, controlling the adjustment for supplying power can include controlling a regulation controller.

In embodiments, controlling the adjustment for supplying power can include controlling selection of circuitry of a resistor divider.

In embodiments, the method can further include determining when a short circuit condition exists in the peripheral and controlling the adjustment for supplying power in response to a determination that a short circuit condition exists.

In a further aspect of the disclosure, a peripheral for mounting on a digital sight of a weapon is provided. The peripheral includes a peripheral body, circuitry, a peripheral interface, and a controller. The peripheral interface is configured for providing a data connection with the digital sight and for mechanically coupling with a cooperating sight interface. The peripheral interface is fixed to the peripheral body and has a peripheral power conductor configured to be coupled with a sight power conductor of the sight interface for receiving adjustably supplied power from the digital sight. The controller is disposed in communication with a non-volatile memory, wherein the controller, upon execution of the instructions is configured to access an optimal power supply level for operation of the circuitry, and send an indication of the optimal power level via data connection to the digital sight.

In embodiments, accessing the optimal power supply level can be performed in response to first receiving power via the adjustably supplied power.

In embodiments, the circuitry can include an over-voltage protection circuit that detects an over-voltage condition and alerts the controller upon detection of an over-voltage condition, and the controller, upon execution of the instructions, can be further configured to indicate the over-voltage condition in the indication of the optimal power level.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
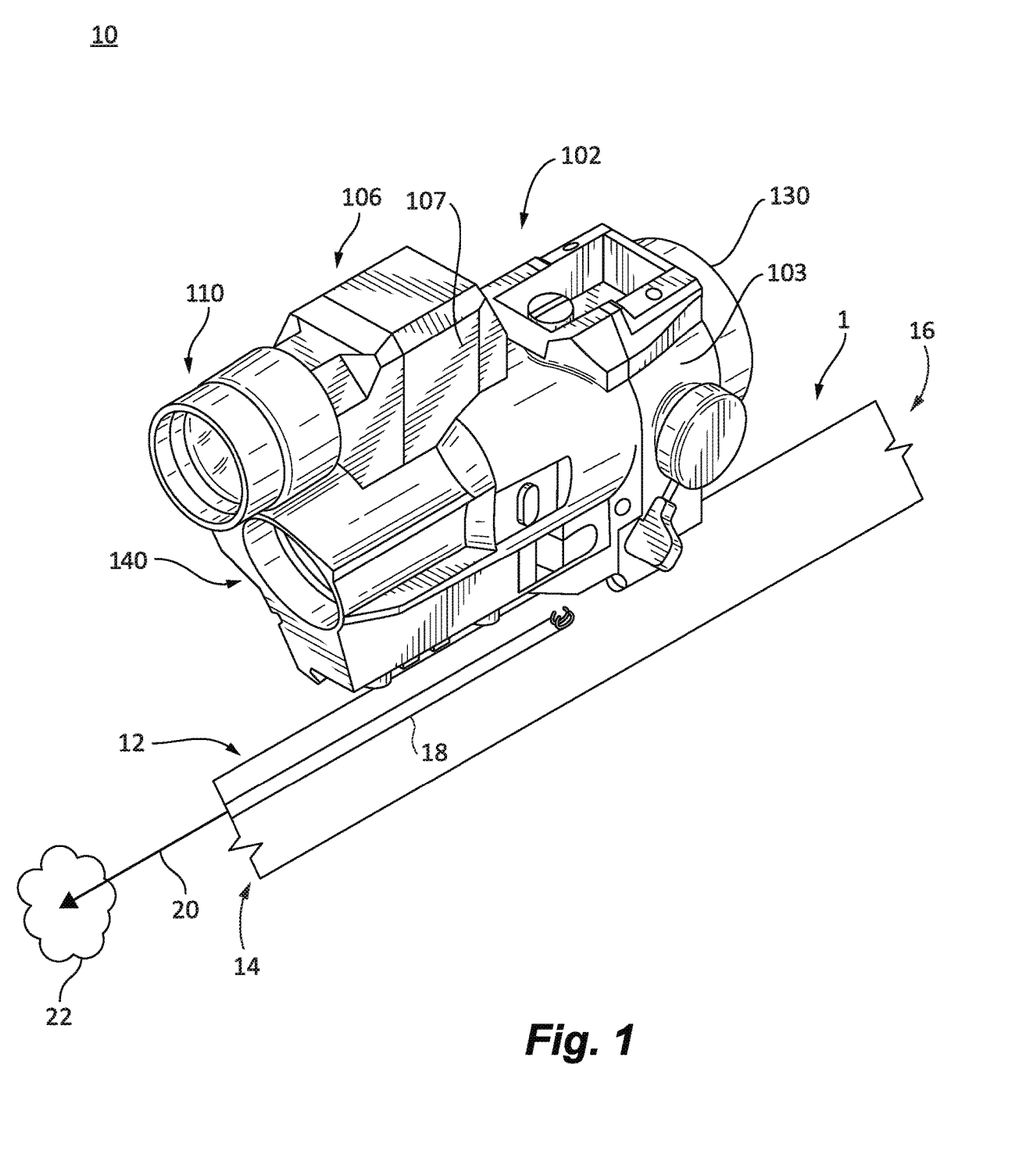
FIG. 1 is a perspective view of an exemplary embodiment of a weapon assembly configured in accordance with the present disclosure, showing a digital weapon sight fixed to weapon assembly by the tactical rail arrangement, and a peripheral removably fixed to the digital weapon sight.

For purposes of explanation and illustration, and not limitation, a partial view of an exemplary embodiment of a digital weapon sight in accordance with the disclosure is shown in FIG. 1 and is designated generally by reference character 102. Other embodiments of digital weapon sights, weapon assemblies having a digital weapon sight, and methods of adjusting power supplied to a peripheral mounted to a digital weapon sight, and peripherals in accordance with the disclosure, or aspects thereof, are provided in FIGS. 2-5, as will be described. The systems and methods described herein can be used to automatically adjust power supplied to a peripheral that is mounted to a digital weapon sight, such as in weapon assemblies for military applications, though the present disclosure is not limited to military applications or to weapon assemblies in general.

Referring to FIG. 1, a weapon assembly 10 is shown. Weapon assembly 10 includes a weapon 12 and digital weapon sight 102. Weapon 12 has a muzzle end 14, a receiver end 16 opposite muzzle end 14, and a bore 18 extending at least partially between receiver end 16 and muzzle end 14. Digital weapon sight 102 can be removably fixed to weapon 12 between muzzle end 14 and receiver end 16 of weapon 12. For example, digital weapon sight 102 can be removably fixed to iron sights affixed to weapon 12. Digital weapon sight 102 has a sight body 103 with one or more sight mechanical mounts 104 (shown in FIG. 2) for mechanically fixation, e.g., removable or non-removable fixation, of a peripheral, e.g., a peripheral 106.

Peripheral 106 has a peripheral body 107 with one or more peripheral mounts 108 (shown in FIG. 2) for mechanically mounting (removably or non-removably fixing) peripheral 106 to digital weapon sight 102. A sensor 110 is supported within peripheral 106 and is configured for data communication with digital weapon sight 102 through a peripheral connector 120 and a sight connector 122 (both shown in FIG. 2). In certain embodiments sensor 110 includes an image sensor of a camera or a laser range finder.

In accordance with certain embodiments an imaging sensor 140 is supported within digital weapon sight 102. In certain embodiments, imaging sensor 140 includes an imaging sensor of a camera, such as in infrared or an infrared sub-band camera. Furthermore a data display device 160 can be disposed within the digital weapon sight 102. Data display device 160 can display data to a user, such as data that was sensed by imaging sensor 140 and processed for display.

It is contemplated that digital weapon sight 102 can be a modular weapon sight arranged to allow for removable fixation of one or more peripherals, such as peripheral 106, which are configured for providing different types of data to digital weapon sight 102. Digital weapon sight 102 can be as described in U.S. Patent Application Publication No. 2017/0122706 A1, filed on Nov. 2, 2016, the contents of which are incorporated herein by reference in their entirety. Examples of suitable digital weapon sights include MDOG® and MADOG® digital weapon sights, available from N2 Imaging Systems, LLC. of Irvine, Calif.

The disclosure encompasses a digital weapon sight 102, a peripheral 106, a weapon sight assembly when the peripheral 106 is mounted to the digital weapon sight 102, a method performed by the digital weapon sight 102, a method performed by the peripheral 106, and a method performed by the digital weapon sight 102 and peripheral 106 when assembled as a weapon sight assembly.

Figure 2:
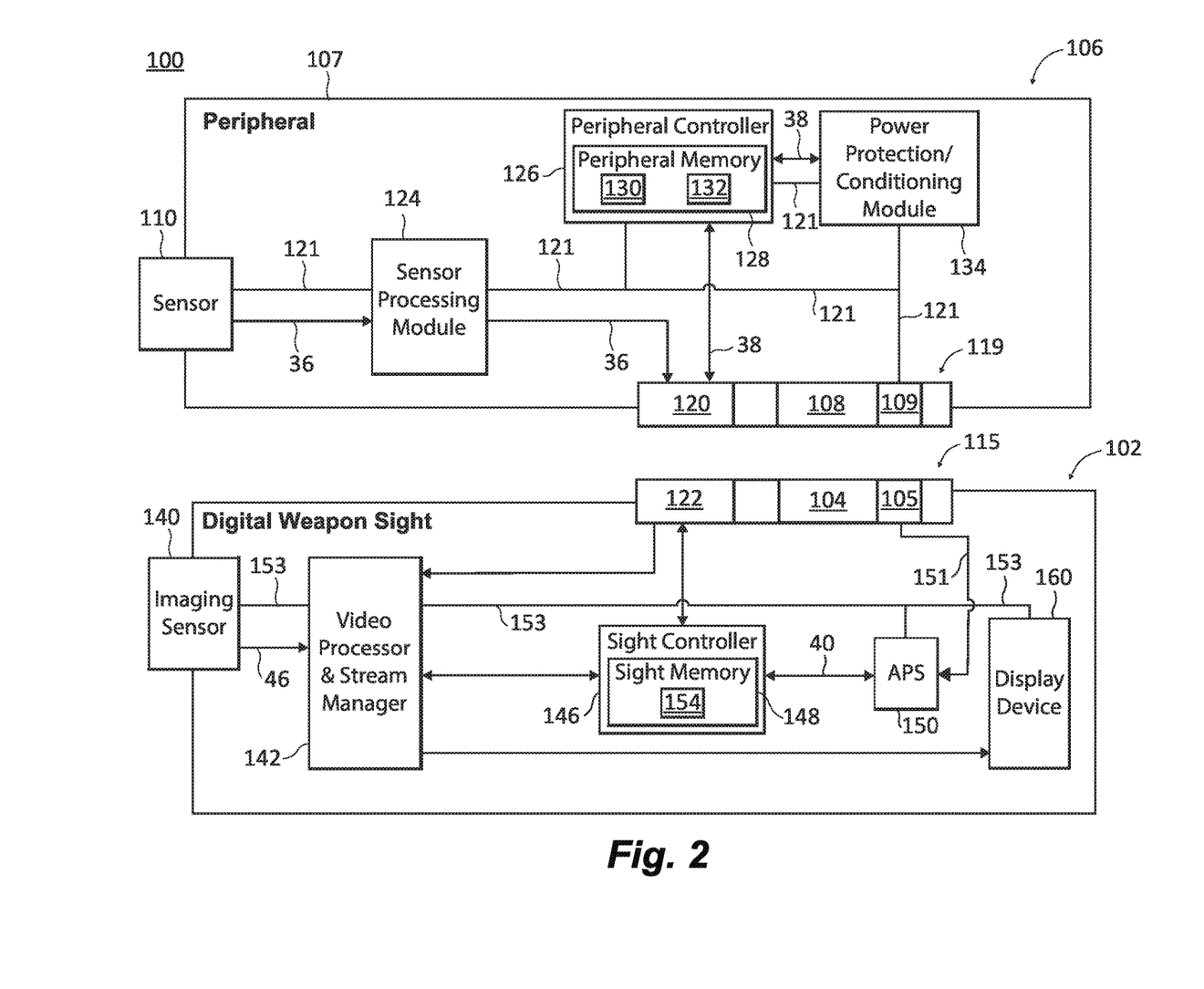
FIG. 2 is a block diagram of an exemplary embodiment of the digital weapon sight in electrical and data communication with the peripheral, in accordance with embodiments of the disclosure.

With reference to FIG. 2, a block diagram of components of peripheral 106 and digital weapon sight 102. Digital weapon sight 102 includes sight body 103 with a sight mechanical mount 104 that is fixed to the sight body 103. Peripheral 106 includes a peripheral body 107 with a peripheral mechanical mount 108 that is fixed to the peripheral body 107. Peripheral mechanical mount 108 is configured for removably fixing peripheral 106 to digital weapon sight 102 at sight mechanical mount 104. Sight mechanical mount 104 is provided with a sight power conductor 105 that is coupled to a first sight power bus 151 of the digital weapon sight 102. Peripheral mount 108 is provided with a peripheral power conductor 109 that is coupled to a peripheral power bus 121 of the peripheral 106. The power is delivered to various components of the peripheral 106 via peripheral bus 121.

Sight mechanical mount 104 and peripheral mechanical mount 108 can physically mate with one another to securely and removably fix the peripheral 106 to the digital weapon sight 102. Additionally, when mated, sight power conductor 105 couples with peripheral power conductor 109, which allows power to be provided by the digital weapon sight 102 to the peripheral 106.

Digital weapon sight 102 further includes a sight connector 122 and peripheral 106 further includes a peripheral connector 120. Sight connector 122 and peripheral connector 120 are configured to enable data communication between the digital weapon sight 102 and the peripheral 106. Sight connector 122 and peripheral connector 120 can include physical (e.g., wires, pins, traces) and/or wireless couplings (e.g., for near-field communication, optical communication). For example, sight connector 122 and peripheral connector 120 can removably physically mate, such as using a Pogo® pad-type connector. Sight connector 122 and peripheral connector 120 can physically mate with one another when peripheral 106 is removably fixed to digital weapon sight 102.

Sight mechanical mount 104 and sight connector 122 can be included together in a sight interface 115. Peripheral mechanical mount 108 and peripheral connector 120 can be included in a peripheral interface 119. Sight interface 115 and peripheral interface 119 can mate with one another to securely and removably fix the peripheral 106 to the digital weapon sight 102. When sight interface 115 and peripheral interface 119 mate, sight mechanical mount 104 and peripheral mechanical mount 108 can be aligned to physically mate with one another, and sight connector 122 and peripheral connector 120 can be aligned to enable data and electrical communication there between. A rail of digital weapon sight 102 can include one or more sight interfaces 115 that can be used to removably fix a peripheral 106 to respective sight interfaces 115.

The sensor 110 of the peripheral 106 is disposed in communication with a sensor processing module 124, such as for providing acquired sensor data via data path 36. Sensor processing module 124 is disposed in communication with peripheral connector 120 and is configured to route sensor data to sight 102 via data connector 120. In certain embodiments sensor 110 includes a camera. The camera can be a visible light camera, an infrared camera, or an infrared sub-band camera such as a near infrared (NIR) sub-band or a short-wave infrared (SWIR) sub-band camera, wherein sensor data includes image data acquired using light incident upon sensor 110 within the visible waveband, infrared waveband, or infrared sub-band. In accordance with certain embodiments sensor 110 can include a laser range finder, wherein sensor data includes range data. It is also contemplated that sensor 110 can include an illuminator, such as visible light illuminator, infrared illuminator, or infrared sub-band illuminator.

Peripheral 106 includes a peripheral controller 126 and a non-volatile peripheral memory 128. The peripheral controller 126 can include, for example, a microcontroller, application specific integrated circuit (ASIC), field programmable gate array (FPGA), programmable system on a chip (PSOC), system on a chip (SOC), hardware, firmware, software, and/or logic circuits, for example, and without limitation. The peripheral controller 126 can also include a user interface and/or a communication interface (not shown) for communicating with other modules of the peripheral 106 and with the peripheral connector 120.

Peripheral controller 126 may be disposed in communication with peripheral memory 128 and sensor processing module 124 for operative connection there through with sensor 110. Peripheral memory 128 includes a non-transitory medium having recorded thereon an optimal power indication 132 and a plurality of program modules 130 that include instructions. In embodiments, the optimal power indication 132 and a plurality of program modules 130 may be configured within peripheral controller 126. The instructions, when read by peripheral controller 126, cause peripheral controller 126 to execute certain actions. For example, the instructions can cause peripheral controller 126 to control sensor 110, e.g., to acquire sensor data, or to communicate with a sight controller 146 of the digital weapon sight 102 via peripheral connector 120 and sight connector 122, such as to transmit the optimal power indication 132 to the sight controller 146. The peripheral controller 126, when executing instructions 130, is configured to access optimal power indication 132 and pass this data to digital weapon sight 102 through a data bus 38, which has conductive connections to peripheral connector 120. Peripheral connector 120 passes the data via sight connector 122 to the sight controller 146. By methods previously explained by various proposed embodiments, the controller 146 adjusts the APS 130 to a level as close as possible to the level specified in the data held by optimal power indication 132.

As will be appreciated by those of skill in the art in view of the present disclosure, use of peripheral memory 128 to retain optimal power indication 132 enables the optimal power indication 132 to be retained within and travel with peripheral 106 following a commissioning calibration and without thereafter requiring power from a battery to retain optimal power indication 132.

Peripheral 106 can optionally include power protection conditioning module 134 that includes circuits that can provide power protection and or signal conditioning for power bus 121. Power bus 121 is used to provide power from power conductor 109 to sensor processing module 124, peripheral controller 126, and sensor 110.

Digital weapon sight 102 provides power from an adjustable power supply (APS) 150 via a first sight power bus 151 to sight conductor 105. The power is received by peripheral conductor 109, via which the power can be protected and/or conditioned by power protection/conditioning module 134 and delivered via peripheral power bus 121 to components of peripheral 106. The adjustable power supply 150 also supplies power to various components of the digital weapon sight 102 via a second sight power bus 153. In embodiments, the digital weapon sight 102 can deliver power having a first power level via first sight power bus 151 to the peripheral 106 and power having a second power level to the other components of the digital weapon sight 102 via the second sight power bus 153.

Imaging sensor 140 is configured for acquiring image data of scene 22 (shown in FIG. 1) from a field of view of digital weapon sight 102. Imaging sensor 140 is disposed in communication with an image sensor processing module 142, such as for providing acquired image data via data path 46.

Image sensor processing module 142 can process the image data and manipulate the image data for display as an image by a display device 160 that can be mounted to sight body 103. Imaging sensor 140 can be, for example, a camera such as visible light camera, an infrared waveband camera, or an infrared sub-band camera like a NIR or a SWIR sub-band camera.

Sight controller 146 can include, for example, a microcontroller, application specific integrated circuit (ASIC), field programmable gate array (FPGA), programmable system on a chip (PSOC), system on a chip (SOC), hardware, firmware, software, and/or logic circuits, for example, and without limitation. The sight controller 146 can also include a user interface and/or a communication interface (not shown) for communicating with other modules of the digital weapon sight 102 and with the sight connector 122.

Sight controller 146 is disposed in communication with image sensor processing module 142 and imaging sensor 140 for operative connection with imaging sensor 140. Sight controller 146 is further disposed in communication with sight connector 122 for receiving optimal power indication 132 from peripheral 106 via peripheral connector 120. Sight controller 146 is further disposed in communication with the adjustable power supply 150 for adjusting the level of power output by the adjustable power supply 150 via first sight bus 151 to the peripheral 106. Sight controller 146 can further receive sensor data acquired by peripheral sensor 110 via peripheral connector 120 and sight connector 122. Sight controller 146 is also disposed in communication with a non-volatile sight memory 148 and display 160.

Sight memory 148 includes a non-transitory medium having recorded thereon a plurality of program module 154 that include instructions. The instructions, when read by sight controller 146, cause sight controller 146 to execute operations. For example, the instructions can cause sight controller 146 to control imaging sensor 140, e.g., to acquire image data, or to communicate with a peripheral controller 126 of the peripheral 106 via sight connector 122 and peripheral connector 120, such as to request the optimal power indication 132 to the sight controller 146. As will be appreciated by those of skill in the art in view of the present disclosure, use of sight memory 148 to retain optimal power indication 132 enables the optimal power indication 132 to be retained within and travel with the digital weapon sight 102 following a commissioning calibration and without thereafter requiring power from a battery to retain optimal power indication 132.

The optimal power indication 132 can be delivered from the peripheral 106 to the digital weapon sight 102 in either a push or pull scenario. For example, in a push scenario, the peripheral 106 can send the optimal power indication 132 to the digital weapon sight 102 without being requested by the digital weapon sight 102. For example, the peripheral controller 126 can retrieve the optimal power indication 132 from peripheral memory 128 and send the optimal power indication 132 at periodic intervals or in response to an event, such as upon detecting by the peripheral controller 126 that the peripheral a power signal has been received via peripheral connector 120 (e.g., via sight connector 122 from the adjustable power supply).

In an example pull scenario, the sight controller 146 can send a request for the optimal power indication 132 to the peripheral controller 126, such as at periodic intervals or in response to an event, such as upon detecting that a peripheral 106 has been coupled to sight connector 122.

In accordance with either a push or pull scenario, when a peripheral 106 is mounted to the digital weapon sight 102, the adjustable power supply 150 supplies a standard level of power to sight connector 122 for provision of standard power to the peripheral 106. The power is delivered to the peripheral 106 via first sight power bus 151 and sight conductor 105. Once the peripheral 106 receives standard power, peripheral 106 can communicate with the digital weapon sight 102. Peripheral controller 126 provides the optimal power indication 132 to sight controller 146, using either a push or pull method. The sight controller 146 controls the adjustable power supply 150 using the optimal power indication 132 to output power along the first sight power bus 151 having a power level that is based on the optimal power indication 132.

In embodiments, the sight controller 146 may be further configured to determine when a short circuit condition exists in the peripheral 106 or within peripheral power conductor 109, sight power conductor 105, or sight interface 115, using short circuit detection capabilities of electronics within the APS 150. The sight controller 146 is further configured to control the APS 150 to adjust the power supplied by the APS 150 to the sight power conductor 105 in response to a determination that a short circuit condition exists.

In embodiments, the power protection/conditioning module 134 of the peripheral 106 can detect an over-voltage condition and alerts the peripheral controller 126 upon detection of an over-voltage condition. The peripheral controller 126 can be configured to indicate the over-voltage condition in the optimal power indication 132.

Figure 3A:
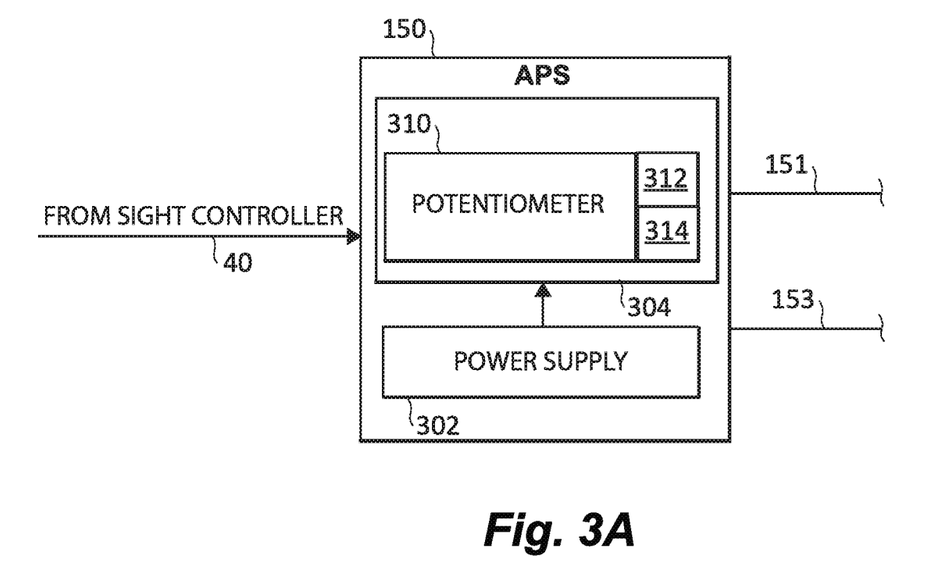
FIG. 3A is a block diagram of an exemplary embodiment of an adjustable power supply of the peripheral, in accordance with embodiments of the disclosure.

FIG. 3A shows a block diagram of the adjustable power supply 150 in accordance with an embodiment. The adjustable power supply 150 receives a control signal via a control bus 40 from the sight controller 146 and outputs an adjustable signal via first sight power bus 151 and a power signal at a second power level via second sight power bus 153. The adjustable power supply 150 includes a power supply 302 and circuitry 304 for adjusting the voltage level. The power supply 302 receives power from an external source, e.g., a battery. The circuitry 150 for adjusting the power includes a regulation controller, shown in the examples as a potentiometer 310 (shown in FIG. 3A) or a resistor divider 320 (shown in FIG. 3B), without limitation to the specific examples. In embodiments, the control signal controls the adjustable power supply 150 to output the power to the first sight power bus 151 via terminal 312 at the first power level, which is adjustable, and to the second sight power bus 153 via terminal 314 at the second power level, which can be fixed. In embodiments, first and second sight power buses 151 and 153 are connected and receive the same power signal from the regulation controller 310 having a selected power level.

Figure 3B:
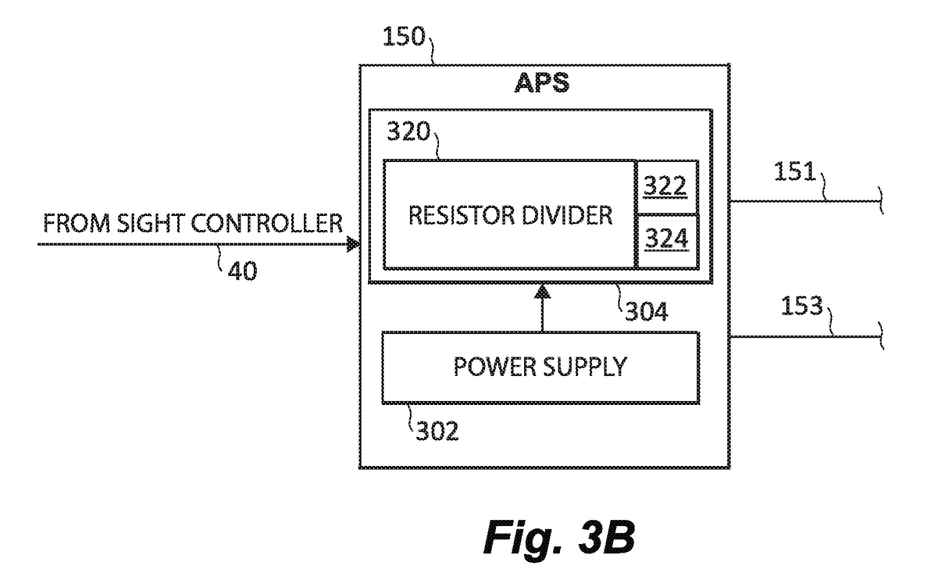
FIG. 3B is a block diagram of another exemplary embodiment of the adjustable power supply of the peripheral, in accordance with embodiments of the disclosure.

FIG. 3A and FIG. 3B show respective block diagrams of example embodiments of the adjustable power supply 150. FIG. 3A shows an embodiment that includes a potentiometer 310 connected to terminals of the power supply 302. In embodiments, the control bus 40 may be connected to control terminals of this potentiometer 310; while resistor terminals of this potentiometer 310 may be connected to power supply 302 as a feedback network. A control signal delivered via control bus 40 can control output of the potentiometer 310. FIG. 3B shows an embodiment that includes a resistor divider 320. The control signal is used to control the resistor divider 320 or network thereof, which acts as feedback network for the adjustable power supply 150 in its control of a power rail voltage. In embodiments, the control signal controls the resistor divider 320 to output the power rail voltage to the first sight power bus 151.

Figure 4:
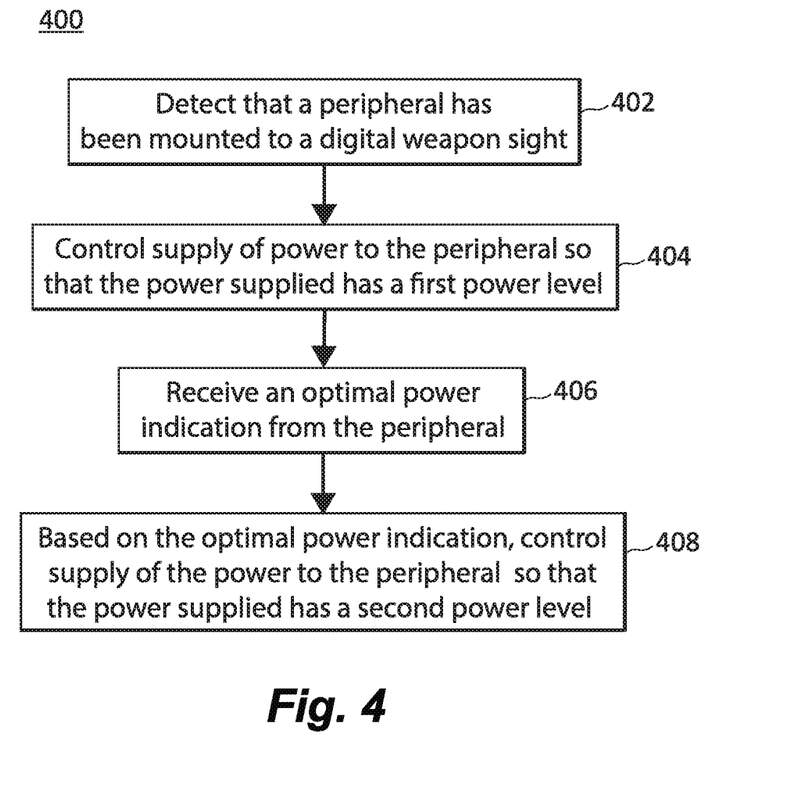
FIG. 4 is a flow diagram of operations performed by a sight controller of the digital weapon sight, in accordance with embodiments of the disclosure.
Figure 5:
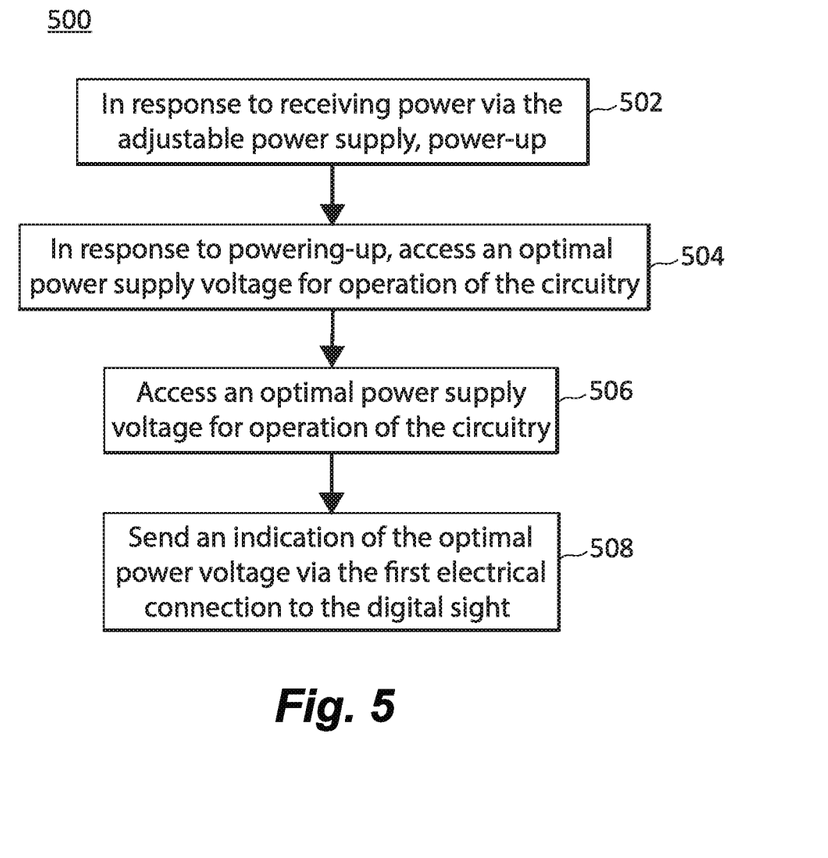
FIG. 5 is a flow diagram of operations performed by a peripheral controller of the peripheral, in accordance with embodiments of the disclosure.

With reference now to FIGS. 4 and 5 shown are flow diagrams demonstrating implementation of the various exemplary embodiments. It is noted that the order of operations shown in FIGS. 4 and 5 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 4 shows a flow diagram 400 that illustrates an example method performed by a controller, such as the sight controller 146 shown in FIG. 2. At operation 402, a detection that a peripheral has been mounted to a digital weapon sight occurs. At operation 404, supply of power to the peripheral is controlled so that the power supplied has a first power level. At operation 406, an optimal power indication is received from the peripheral. At operation 408, based on the optimal power indication, supply of the power to the peripheral is controlled so that the power supplied has a second power level.

FIG. 5 shows a flow diagram 500 that illustrates an example method performed by a controller, such as the peripheral controller 126 shown in FIG. 2. At operation 502, in response to receiving power via the adjustable power supply, the controller powers-up. Powering-up can include booting the processor of the controller, which can include accessing the instructions recorded in a read-only-memory (ROM), such as a ROM that configures the processor for operation. At operation 504, in response to powering-up, an optimal power supply voltage for operation of the circuitry is accessed. At operation 506, an indication of the optimal power voltage via the first electrical connection to the digital sight is transmitted. Transmission of the indication of the optimal power voltage can be to the digital weapon sight 102, such as via peripheral connector 120.

Aspects of the present disclosure are described above with reference to flow diagram illustrations and/or block diagrams of methods, apparatus (systems) and computer program products according to embodiments of the disclosure. It will be understood that individual blocks of the flow diagram illustrations and/or block diagrams, and combinations of blocks in the flow diagram illustrations and/or block diagrams, can be implemented by computer program instructions (e.g., 130 or 154). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

As will be appreciated by those of skill in the art in view of the present disclosure, storage of the optimal power indication by the non-volatile memory of the peripheral, and provision of the optimal power indication by the peripheral to the digital weapon sight allows each peripheral to operate efficiently using optimal power for its unique efficiency profile. This can minimize power drawn by the peripheral from the digital weapon sight. When a peripheral can be powered based on its optimal power indication, the peripheral does not need a particular design that accommodates the particular input voltage that the digital weapon sight uses. A digital weapon sight will also be compatible with a larger selection of peripherals, including peripherals that were not designed to accommodate that particular digital weapon sight.

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A digital sight for a weapon, comprising:
an adjustable power supply (APS) configured to supply power;
a sight body;
a sight interface for mechanically coupling with a cooperating peripheral interface of a peripheral for fixing the peripheral to the digital sight, the sight interface being fixed to the sight body and having a sight power conductor connected to the APS for receiving power supplied by the APS, the sight power conductor being coupled with a peripheral power conductor of the peripheral interface for providing power from the adjustable power supply to the peripheral; and
a controller disposed in communication with a non-volatile memory, wherein the controller, upon execution of instructions is configured to:
receive a data communication having an optimal power indication from the peripheral;
based on the optimal power indication, control the APS to adjust the power supplied by the APS to the sight power conductor;
determine when a short circuit condition exists in the peripheral; and
control the APS to adjust the power supplied by the APS to the sight power conductor in response to a determination that a short circuit condition exists.

2. The digital sight of claim 1, wherein the power provided by the APS to the sight power conductor has a first power level before receiving the optimal power indication, and in response to the controller controlling the APS, the APS adjusts the power level of the power supplied to the sight power conductor to have a second power level different from the first power level.

3. The digital sight of claim 2, wherein the controller is powered by power having a third power level supplied by the APS.

4. The digital sight of claim 1, wherein the optimal power indication is received from the peripheral via a connector of the sight interface that is configured for data communication with a peripheral connector of the peripheral interface.

5. The digital sight of claim 1, wherein the sight interface mechanically couples with the cooperating peripheral interface for removably fixing the peripheral to the digital sight.

6. The digital sight of claim 1, further comprising a sensor for sensing at least one of images and pulses, and a processing system configured to process the sensed at least one of images and pulses.

7. The digital sight of claim 1, wherein the APS includes a regulation controller, and controlling the APS includes controlling the regulation controller.

8. The digital sight of claim 1, wherein the APS includes a resistor divider, and controlling the APS includes controlling selection of circuitry of the resistor divider.

\* \* \* \* \*